United States Patent Office 2,801,273
Patented July 30, 1957

2,801,273
POLYMERIZATION OF OLEFINS

Hans Bohlbro and Knud Riishede, Hellerup, Copenhagen, Denmark, assignors to Esso Research and Engineering Company, a corporation of Delaware No Drawing. Application November 26, 1952,
Serial No. 322,820

Claims priority, application Great Britain
December 31, 1951

6 Claims. (Cl. 260—683.15)

The present invention relates to the catalytic polymerization of olefins in the vapour phase and relates more particularly to the low pressure polymerization of normally gaseous olefins to form liquid products boiling in the gasoline range.

In the refining of petroleum oils large quantities of hydrocarbon gases are produced, e. g., by cracking processes, which contain substantial amounts of olefins. In general the olefins are predominantly propylene and butylenes and by their controlled polymerization there may may be produce higher olefins boiling in the gasoline range. Such polymers may be used as such or after hydrogenation as a high octane gasoline blending stock.

Several methods are known for effecting such polymerization, both catalytic and non-catalytic. The non-catalytic processes operate under elevated temperatures and pressures of the order of 1,000 lbs./sq. in. Many different catalysts have been proposed for use in the catalytic processes ranging from adsorbents such as activated clay, through mineral acids such as phosphoric and sulphuric acids to Friedel-Crafts type catalysts exemplified by the halides of aluminium and boron. The most commonly used catalysts for the so-called non-selective polymerization of unsaturated refinery gases to gasoline products are of the phosphoric acid type. The Friedel-Crafts catalysts are more active in their action and are used mainly for polymerization to higher products in the lubricating oil range, with or without simultaneous alkylation or arylation of the product.

In general such polymerization reactions are carried out in so-called liquid phase and, therefore, under a suitably high pressure, the maintenance of which adds significantly to the cost of the process.

It is an object of the present invention to provide a process whereby high yields of hydrocarbons boiling in the gasoline range may be produced by catalytic polymerization of normally gaseous olefins in the vapour phase and at relatively low temperatures and pressures.

The halides of boron, notably boron fluoride, are intrinsically attractive catalysts for such a process, but possess marked disadvantages arising from the fact that they are gases. Thus it is necessary to inject the catalyst in the gaseous state into the reaction zone which complicates control of the reaction to give optimum yields of products boiling in the desired range. Furthermore, excess catalyst is carried out with the liquid product which means that either polymerization will continue to give undesirable higher polymers, or that the excess catalyst must be hydrolysed to make it inactive with consequent waste.

It is accordingly a further object of the invention to provide an improved boron halide catalyst and polymerization process employing it, whereby good yields of gasoline hydrocarbons may be obtained from normally gaseous olefins with a low consumption of catalyst and simplified reaction control.

The reaction conditions of the process of the present invention involve temperatures of from 0° C. to 200° C. and pressures sufficiently low to maintain the reactant olefins in vapour phase. Preferably low temperatures such as room temperature or 20 or 30° C. are employed, although higher temperatures such as 70° C. or 100° C. or even higher may be used for example at the end stages of a batch process where the catalyst activity has begun to diminish. In general the temperature will be chosen so as to give optimum results relative to catalyst activity (percent conversion) on the one hand and catalyst stability on the other. At higher temperatures such as those above 150° C. there is a tendency for the catalyst to evaporate unduly rapidly. The reaction pressure is dictated largely by the source of the olefin feed and the maintenance of vapour phase operation. This, of course, means that the olefin gases are in vapour phase while the gasoline product is in the liquid phase. The process works well at atmospheric pressure, but higher pressures, e. g. up to 10 atmospheres or even more, may be used, especially when the olefins come from a source in which they are already under a substantial pressure, e. g. a refinery $C_4$ cut. In such cases there is obviously no point in reducing the pressure to atmospheric, while equally when the gases are delivered at atmospheric pressure there is little point in compressing them excessively. In general the selection of a suitable reaction pressure will be a matter of common sense, bearing in mind that the lower the pressure the lower will be the volumetric efficiency of the reactor, and the higher the pressure the greater will be the investment cost of the plant.

As already stated the preferred feed olefins are cracked refinery gases which will normally contain propylene and mixed butylenes, together with some propane and butanes. For special purposes purified feeds may be used, e. g. propylene or isobutylene alone. Also the presence of ethylene in the feed is not disadvantageous.

It is well known that the boron halides, especially boron fluoride, form complexes of various degrees of stability with a number of compounds, and the use of some of these complexes as polymerization catalysts has been proposed in the past, notably for the liquid phase polymerization of olefins to polymers boiling in the lubricating oil range, and for the low-temperature polymerization of olefins to high molecular weight rubbery polymers such as butyl rubber. The most commonly used complexes for this purpose are those with ethers such as diethyl ether.

It has now been found, according to the present invention, that a particularly suitable class of boron halide complexes for use in a vapour phase polymerization reaction of the character described consists of oxygenated organic compounds containing at least one active oxygen atom. By the expression "active" oxygen atoms there is meant an oxygen, one of whose valencies is satisfied by a carbon atom, the other valency bond being satisfied by an atom other than a second carbon atom, and preferably by a hydrogen atom. Thus an ether oxygen atom —C—O—C— is not active within the sense of this definition, whereas a carbonyl group —C=O is active since both valencies are satisfied by the same carbon atom. Other more obvious examples of active oxygen groups are hydroxyl —OH, and carboxyl —COOH.

It is very much preferred that there should be at least two oxygen atoms in the molecule, both of which are advantageously active. It is also desirable that the carbon chain between the two oxygen atoms should consist of not more than four carbon atoms. In general aliphatic compounds are preferred to aromatic since they form somewhat more stable complexes. The molecular weight or chain length of the compounds used is of relatively small importance as regards its maximum value, except that the bigger the molecule the smaller the percentage of active halide in the product. As regards the lower limit the compound should be of such a molecular weight that the complex formed is not unduly volatile under the reaction conditions. A further important point is that the compound should be free from olefinic unsaturation since otherwise it will polymerise under the influence of the boron halide. As a general rule it is preferred that the organic compound should boil above 100° C. and preferably above 150° C.

Examples of simple oxygenated compounds which may be used in the process of the invention are the monohydric alcohols, monobasic acids, ketones and aldehydes. Alcohols such as the amyl, hexyl, octyl and nonyl alcohols may be used, the octyl and nonyl alcohols being readily available from the so-called OXO synthesis which can also provide the corresponding aldehydes. Lower molecular weight acids such as propionic, butyric, valeric and caproic acids may also be used. Esters provide another source of suitable materials and any of the simple alkyl esters of the fatty acids which have suitable properties may be used for this purpose. Mixed alcohols such as diacetone alcohol may also be used.

As already stated, however, the preferred compounds are those containing two or more oxygen atoms. Examples of these are the polyhydric alcohols, polybasic acids and hydroxy acids. Suitable polyhydric alcohols include ethylene glycol and its higher homologues, such as propylene and butylene glycols, and the polyalkylene glycols, such as di- and tri-ethylene or propylene glycols which are readily prepared by the polymerization and hydrolysis of the corresponding olefin oxides. Other suitable alcohols include glycerol. In general, the anhydrous hexitols or sugars are not suitable as they do not form complexes readily with boron fluoride, at below their melting point, while above it undesriable side reactions occur. It is, therefore, a further desirable property of the organic compounds used in the present invention that they should be liquid at normal temperatures, or should have melting points not greatly in excess of 50 or 60° C., although higher melting materials may be used provided that they form satisfactory complexes.

Several of the dibasic acids which have relatively low melting points may be used, however, examples being glutaric (M. P. 97° C.) and pimelic (M. P. 103° C.). Many of their esters melt at lower temperatures, however, e. g. methyl succinate (M. P. 19° C.), and are more suitable for use.

The hydroxy fatty acids constitute a further desirable class of compounds and may be exemplified by alpha-hydroxy propionic acid (lactic acid), beta-hydroxy propionic acid, hydroxy butyric acid and their various homologues.

Typical aromatic compounds include the phenols, and aromatic acids of the benzoic acid series, but as already stated the aliphatic compounds are preferred.

Compounds containing an ether oxygen link either in a straight chain or ring may also be used, provided that there is also an active oxygen atom present. Illustrative of such compounds are the polyglycols already mentioned, the glycol ethers, such as ethylene glycol, mono-butyl ether and its homologues, many of which are known under the registered trademark "Cellosolve" and the like. Ring compounds may be illustrated by tetrahydro furfuryl alcohol.

The complexes may generally be prepared simply by adding boron fluoride to the organic compound until a sufficient amount has reacted. The reaction may be carried out at ambient or slightly elevated temperature, and the product is then desirably absorbed on a solid carrier such as activated carbon, fuller's earth, kieselguhr, silica or alumina gels or the like. The relative amounts of boron fluoride and organic compound are preferably at least one molar proportion of $BF_3$ to each mole of the other compounds. Molar ratios between 1 and 2, e. g. 1.5, are preferred. The amount of catalyst to be absorbed on the carrier may vary widely, depending to a large extent on the physical nature of the carrier. Thus, some activated carbons can easily absorb up to 0.75 gm./c.c., whereas the absorptive capacity of silica gel for example is very much lower.

The catalyst may be maintained as a fixed bed in a reactor at suitable temperature and pressure and the gaseous olefins allowed to flow either upwardly or downwardly through the bed, the liquid product being withdrawn from the lower part of the reactor.

The following examples will serve to illustrate the invention. In all cases the feed gas used consisted of a mixture by volume of propane 15%, isobutylene 20%, n-butylenes 35%, butanes 30%. The catalyst consisted of 13.3 grams of the complex specified supported on 20 ccs. of activated carbon. The gases were passed downwardly at a space velocity of 100 vols. gas/vol. catalyst/hour through a bed of the catalyst maintained in a glass tube equipped with a heating coil. Yields or "percentage conversion" were measured both by direct weighing of the liquid product, and by analysis of the feed and effluent gas stream.

The term "percentage conversion" as used here is a measure of the crude liquid product obtained including dissolved gas. Thus measurement of the feed and effluent gas rates provides a measure of total gas disappearance, this gas appearing predominantly as olefin polymer, with small amounts of paraffin alkylate in some cases, and as dissolved gas, in the liquid product. For convenience the gas disappearance has been assumed to be 100% olefin and the percent conversion is thus the total gas consumed as a percentage of the initial olefin content. In some cases this exceeds 100% which is partly attributable to the presence of dissolved gas and partly to alkylation. This has been checked by measurement of the actual olefin disappearance as the difference between the olefin content of the feed and of the effluent and the results so obtained correlate reasonably well with those obtained by direct weighing of the liquid product and by measuring total gas disappearance.

*Example 1*

The catalyst was a complex prepared by reacting 15.6 gms. of boron fluoride to 25 gms. of 90% lactic acid at room temperature, thus forming a complex containing 0.92 mole $BF_3$ per mole of lactic acid. The reaction was started at 20° C. and was maintained at this temperature for 24 hours. During the initial stages the conversion increased rapidly from 22–32% and then decreased slowly to 22%. The temperature was then raised to 70° C. when the conversion rose to 48% and after a further 56 hours had decreased to 20%.

The liquid product was fractionally distilled and consisted of 23% dissolved gas, 69% 92–205° C. gasoline and 8% higher polymers. The percentage of gasoline in the normally liquid distillate was thus 90%.

*Example 2*

The catalyst was similar to that of Example 1, but contained 1.4 mols. $BF_3$ per mol. of lactic acid.

The reaction was started at 20° C. and maintained at this temperature for 150 hours. The conversion decreased from an initial high value of 106% to 70% in 10 hours and thereafter decreased gradually to a value of 50% at the end of the 150 hours run.

Distillation analysis showed that the percentage of gasoline in the normally liquid distillate was 70.5%.

*Example 3*

In this example a complex of equimolar proportions of ethylene glycol and boron fluoride was tested.

The reaction was started at 20° C. and during a period of 4 hours the conversion decreased steadily from 30% to 12%. The temperature was raised to 90° C. with a corresponding increase in yield to 58%, but this decreased fairly rapidly to 42%.

Distillation analysis of the product of the 90° C. run showed a gasoline content of 89% in the normally liquid product.

*Example 4*

In this example a complex of 1 mole of ethylene glycol with 1.47 moles of $BF_3$ was used as catalyst.

The initial reaction temperature was 20° C. as before and was maintained at that value for 47 hours, during which period the conversion decreased from its initial value of 70% to 49%. The temperature was then raised to 100° C. for a further 45 hours, during which time the yield decreased from 100% to 36%.

Distillation analysis of the product showed a gasoline content of 65% for the product of the 20° run and 77% for the 100° C. run.

*Example 5*

In this example a complex of 0.51 mole of $BF_3$ with 1 mole of lauryl alcohol derived from coconut oil was used.

The initial reaction temperature was 20° C. and was maintained for 46 hours during which time the yield decreased from 61% to 8% at a more or less uniform rate. The temperature was then raised to 75° C. with no appreciable effect on the yield, which diminished to zero in a further five hours. Analysis of the liquid product showed 80% gasoline content which is satisfactorily high, but it will be obvious that the general performance of this catalyst was greatly inferior to that of the preferred bifunctional complexing agents of the other examples.

From these examples it will be seen that supported boron fluoride complexes of the type described are effective and long-lived catalysts for the vapour-phase polymerization of olefins. Particularly when more than 50 mol. percent of boron fluoride is present in the complex they have very high activity, and their stability at relatively high operating temperatures of the order of 100° C. is quite marked.

These properties greatly facilitate control of the polymerization reaction and economical use of catalyst. The choice of optimum catalyst composition and reaction conditions for any given feedstock and any desired product distribution may be ascertained by relatively simple experiment.

Various modifications of the operating technique described may be incorporated, particularly when operating on the plant scale as will be clear to those skilled in the art. Thus, for example, the gases may be passed through a bed of catalyst in the form of a suitable absorbent impregnated with the complex selected, while supplementary complex and/or boron fluoride is continually or intermittently injected into the bed. In this way the catalyst activity may be maintained at a desired level over long periods.

Alternatively a guard bed of absorbent either unimpregnated or impregnated only with the complex-forming material may be maintained on the outlet side of the catalyst bed so that volatile complex or free boron fluoride from complex decomposition is reabsorbed in the guard portion. When the bulk of the catalyst activity has been transferred to the guard portion, the direction of flow of the feed gases may be reversed, with the result that in due course the catalyst will be transferred back to the original active portion. Supplementary make-up catalyst may, of course, be added as well to compensate for any absolute catalyst loss.

Thus, to summarize, the present invention provides an improved process for the vapour phase polymerization of normally gaseous olefins to products boiling in the gasoline boiling range in which there is employed as a catalyst a complex of boron fluoride with an organic compound containing at least one end preferably two active oxygen atoms per molecule. The complex preferably contains at least 40 mole percent $BF_3$ and desirably above 50%, and is preferably carried on a solid support.

What we claim is:

1. A method for polymerizing normally gaseous olefins to polymers boiling in the gasoline range which comprises contacting said olefins in the vapor phase at a temperature below about 100° C. with a supported catalyst comprising a complex of boron fluoride with a saturated hydroxy carboxylic acid having no more than 7 carbon atoms in the molecule, the mol ratio of said boron fluoride to said organic compound in said complex being at least 1:1.

2. A method as in claim 1 wherein the polymerization is effected at a pressure of less than 10 atmospheres.

3. A method according to claim 1 wherein the hydroxy carboxylic acid boils above about 100° C.

4. A method according to claim 1, wherein the feed olefins contain a proportion of make up catalyst to maintain the activity of the bed.

5. A method according to claim 1, wherein the feed olefins pass through a bed of active catalyst followed by a bed of unimpregnated absorbent to absorb catalyst carried from the active bed and wherein the direction of flow of the feed gases is reversed when a substantial proportion of the catalyst has been transferred to the initially impregnated bed.

6. A process for polymerizing normally gaseous olefins to polymers boiling in the gasoline boiling range which comprises passing said olefins in the vapor phase through a bed of catalyst comprising a $BF_3$-lactic acid complex supported on a solid adsorbent support at a temperature below about 100° C., the mol ratio of said $BF_3$ to lactic acid in the complex being in the range of about 1:1 to 2:1.

References Cited in the file of this patent

UNITED STATES PATENTS

| | | |
|---|---|---|
| 2,076,201 | Langedijk et al. | Apr. 6, 1937 |
| 2,085,535 | Langedijk et al. | June 29, 1937 |
| 2,142,980 | Huijser et al. | Jan. 3, 1939 |
| 2,182,617 | Michel | Dec. 5, 1939 |
| 2,224,349 | Holm et al. | Dec. 10, 1940 |
| 2,379,656 | Ruthruff | July 3, 1945 |
| 2,525,787 | Fontana et al. | Oct. 17, 1950 |
| 2,588,358 | Carlson et al. | Mar. 11, 1952 |

OTHER REFERENCES

Topchiev et al. as abstracted in vol. 41, Chem. Abstr., col. 3946–3947 (June 1947).